Figure 1:
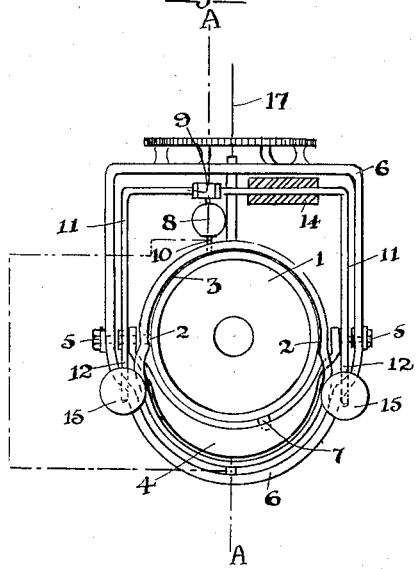

Feb. 11, 1930.  J. B. HENDERSON  1,746,832
GYROSCOPIC COMPASS
Original Filed Nov. 8. 1919

Inventor
James Blacklock Henderson

Patented Feb. 11, 1930

1,746,832

UNITED STATES PATENT OFFICE

JAMES BLACKLOCK HENDERSON, OF BLACKHEATH, ENGLAND

GYROSCOPIC COMPASS

Application filed November 8, 1919, Serial No. 336,627, and in Great Britain November 14, 1913. Renewed November 17, 1928.

(GRANTED UNDER THE PROVISIONS OF THE ACT OF MARCH 3, 1921, 41 STAT. L., 1313)

The object of my invention is to provide for preventing or reducing the deviation of a gyroscopic compass due to rolling or pitching of a ship. When the ship's course is on the meridian and she is rolling, the point of suspension of the compass is subject to periodic horizontal translation and since the compass acts as a pendulum in the E. W. plane the bob of that pendulum lags behind or leads in front of the point of suspension according to whether the latter is accelerating or decelerating. In other words, the pendulum is subjected to forced oscillations. These produce no deviation of the compass however. When the ship is on an intercardinal course, say N. E. or N. W. and the rolling continues, the periodic motion of the point of suspension is at 45° to the plane of free oscillation of the pendulum, the compass being incapable of oscillation in the meridian vertical plane except with the very slow precessional oscillation of a period about 90 minutes. The impulses transmitted to the pendulum through the point of suspension have components in the E. W. vertical plane and, as before, produce forced oscillation, causing the bob of the pendulum to lag or lead relatively to the point of suspension according to whether the latter is accelerating or decelerating. The component acceleration or deceleration in the meridian vertical plane combined with the respective lag or lead of the bob in the E. W. vertical plane give a couple round the vertical tending to make the plane of oscillation of the pendulum agree with the plane of rolling of the ship. This couple causes a deviation of the compass.

In compasses in which the gyroscope is mounted on a horizontal trunnion in neutral equilibrium and to which gravitational stability is imparted by a pendular weight linked to the gyroscope casing as in the Sperry compass, I eliminate or greatly reduce the above disturbing couple by using two pendular weights one linked to the upper end of the casing and the other to the lower end. Both weights then give gravitational stability and if both are required also to produce a damping of the gyroscopic precession the link connections between the weights and the compass casing can be connected to the latter at opposite ends of a diameter of the casing. Any lateral acceleration of these weights then produces no resultant couple.

The invention is also applicable to compasses of the floating type in which the moving system is suspended by flotation in a mercury bath if the gyroscope casing is mounted in neutral equilibrium on trunnions.

In each type of gyroscopic compass I arrange, by suitable design of parts, a pendular weight above or below the virtual or actual centre of suspension of the gyroscope which will increase or diminish the gravitational stability and diminish the couples round the vertical axis due to lateral acceleration. In some cases the pendulum may be an inverted one.

Figure 2:
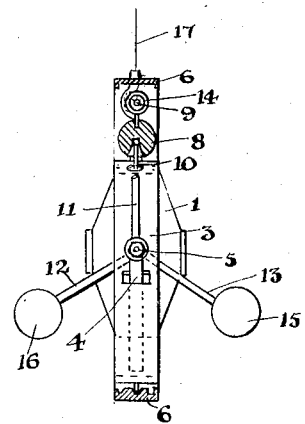

In the accompanying drawings illustrating my invention,

Figs. 1 and 2 show a side elevation and vertical section, respectively, of one method of applying my invention to a compass of the type suspended on a wire, in which an auxiliary pendulum is used, Fig. 2 being a section of Fig. 1 on the line AA, the ring gear shown at the top of Fig. 1 being omitted.

In Figs. 1 and 2 the gyroscope rotor casing or frame 1 is supported by the trunnions 2 fixed on the gimbal ring 3 which is suspended by the wire suspension 17. The gravitational stability is imparted to the compass by the bail weight 4 which is suspended from the trunnion axis 5 fixed to the outer frame 6 coaxial with the trunnions 2. The bail weight 4 engages with the pin 7 fixed to the rotor casing 1 and stability is also imparted to the casing 1 by the pendulum bob 8 which is suspended from the rod 9 and which engages with the pin 10 fixed to the rotor casing 1 as is shown in section in Fig. 2. The knob on the pin 10 engages with the slot in the pendulum bob 8 at about the centre of impact of the pendulum. In order that the axis of suspension of the pendulum 8 may remain vertically over the trunnion axis 2 while the compass oscillates with the rolling of the ship, the rod 9 forms part of an inertia bar or pendulum having a large amount of inertia, pivoted on the trunnion axis 5 and having a very long period of oscillation about that axis. This inertia bar consists of the three radiating rods 11, 12 and 13, in duplicate pivoted on the trunnion 5 and joined together by the rod 9. The masses 14, 15 and 16 serve to provide the necessary moment of inertia and gravitational stability and are adjusted so that the period of oscillation is long compared with the period of roll of the ship. It is evident that whereas both the pendulums 4 and 8 contribute to the gravitational stability of the compass rotor casing, the effects of rapid alternating accelerations in the meridian due to the ship rolling are the application of approximately equal and parallel horizontal forces to the pins 7 and 10 which produce no deviation of the compass, whereas for long continued acceleration as when the ship changes her speed along the meridian the inertia bar 11, 12, 13 turns about the trunnion axis until 11 lies along the virtual vertical and so both pendulum 4 and pendulum bob 8 act together to produce the ballistic deviation of the compass, which, in normal working, should be equal to the deviation due to the rate of change of latitude.

Having now particularly described and ascertained the nature of my said invention and in what manner the same is to be performed, I declare that what I claim is:—

1. A gyroscopic compass comprising a rotor and rotor casing pivotally supported about a horizontal axis, a pendulous mass supported adjacent the casing, a connection between the mass and the casing, a second pendulous mass supported adjacent the casing, a connection between the second mass and the casing, and means associated with the second mass for maintaining its axis of suspension vertically over the horizontal supporting axis.

2. A gyroscopic compass comprising a rotor and a rotor casing mounted to turn about vertical and horizontal axes, a pendulous mass supported at the bottom of the casing, a connection between the mass and the casing on one side of the vertical axis, a second pendulous mass supported at the top of the casing, and a connection between the second mass and the casing on the opposite side of the vertical axis.

3. A gyroscopic compass comprising a rotor and a circular rotor casing mounted to turn about vertical and horizontal axes, a pendulous mass supported at the bottom of the casing, a connection between the mass and the casing on one side of the vertical axis, a second pendulous mass supported at the top of the casing, and a connection between the second mass and the casing substantially diametrically opposite to the first named connection.

4. A gyroscopic compass for use on a moving craft, comprising a gyroscope mounted on trunnions in neutral equilibrium, and a plurality of separate weight systems connected to the gyroscope for reducing the couple about the trunnion axis which produces deviation of the compass when the craft rolls while on an intercardinal course, said systems having a common pivotal axis parallel to the plane of rotation of the gyroscope.

5. A gyroscopic compass for use on a moving craft, comprising a gyroscope mounted on trunnions in neutral equilibrium about normally horizontal and vertical axes, and a plurality of separate weight systems connected to the gyroscope for reducing the couple about the vertical axis produced by the rolling of the craft when on an intercardinal course, said systems having a common pivotal axis parallel to the plane of rotation of the gyroscope.

6. A gyroscopic compass comprising a gyroscope pivotally supported about a horizontal axis, a pendulous mass, a mass for increasing the moment of inertia of said pendulous mass, said masses having a common pivotal axis parallel to plane of rotation of the gyroscope, and a connection between said masses and said gyroscope to impress the effect of the former upon the latter.

7. A gyroscopic compass for use on a moving craft, comprising a gyroscope, means for mounting the gyroscope so as to be free to turn about a vertical axis and for oscillation about a horizontal axis, a pendulum and a weighted rotatable element for increasing the moment of inertia of said pendulum, said pendulum and rotatable element being both pivotally mounted about said horizontal axis, and a connection between the gyroscope on the one hand and the pendulum and the element on the other hand.

Dated this 6th day of October, 1919.

JAMES BLACKLOCK HENDERSON.